(12) United States Patent
Wang (10) Patent No.: US 11,885,596 B2
(45) Date of Patent: Jan. 30, 2024

(54) HYBRID-LAYERED CELL AND BULLETPROOF STRUCTURE HAVING THE SAME

(71) Applicant: Zhenkun Wang, Ashburn, VA (US)

(72) Inventor: Zhenkun Wang, Ashburn, VA (US)

( * ) Notice: Subject to any disclaimer, the term of this patent is extended or adjusted under 35 U.S.C. 154(b) by 0 days.

(21) Appl. No.: 16/894,092

(22) Filed: Jun. 5, 2020

(65) Prior Publication Data
US 2021/0108894 A1    Apr. 15, 2021

(30) Foreign Application Priority Data

Oct. 11, 2019    (CN) .......................... 201921709979.4

(51) Int. Cl.
| | | |
|---|---|---|
| F41H 5/04 | (2006.01) | |
| B32B 15/04 | (2006.01) | |
| B32B 7/12 | (2006.01) | |
| B32B 23/04 | (2006.01) | |
| B32B 15/18 | (2006.01) | |

(52) U.S. Cl.
CPC ............. F41H 5/0457 (2013.01); B32B 7/12 (2013.01); B32B 15/04 (2013.01); B32B 15/18 (2013.01); B32B 23/042 (2013.01); *B32B 2250/04* (2013.01); *B32B 2307/51* (2013.01); *B32B 2571/02* (2013.01)

(58) Field of Classification Search
CPC ........ F41H 5/04; F41H 5/0442; F41H 5/0457; F41H 5/0464; F41H 5/0492; F41H 5/0478; F41H 5/0471; B32B 2571/00; B32B 2571/02
See application file for complete search history.

(56) References Cited

U.S. PATENT DOCUMENTS

| | | | | |
|---|---|---|---|---|
| 4,148,469 A | * | 4/1979 | Geyer .................... | F16F 1/122 267/179 |
| 6,698,331 B1 | * | 3/2004 | Yu ........................ | F41H 5/0442 428/613 |
| 7,571,493 B1 | * | 8/2009 | Purvis ..................... | F41H 1/02 2/2.5 |
| 2006/0191403 A1 | * | 8/2006 | Hawkins ................. | F41H 5/04 89/36.05 |
| 2008/0047418 A1 | * | 2/2008 | Warren ................ | F41H 5/0428 89/36.02 |
| 2008/0105114 A1 | * | 5/2008 | Gabrys .................... | F41H 7/04 89/36.02 |

(Continued)

*Primary Examiner* — Alicia J Weydemeyer
(74) *Attorney, Agent, or Firm* — WPAT, PC (57) ABSTRACT

A hybrid-layered cell for a bulletproof structure includes a viscous absorber layer, a first elastic metal layer, a viscous-elastic foundation layer and a second elastic metal layer, orderly arranged in a lamination manner. The viscous absorber layer contains a semi-liquid viscous material. The first elastic metal layer, laminated fixedly to the viscous absorber layer, has a first predetermined toughness. The viscous-elastic foundation layer, laminated fixedly to the first elastic metal layer by opposing the viscous absorber layer, has predetermined elasticity and compressibility. The second elastic metal layer, laminated fixedly to the viscous-elastic foundation layer by opposing the first elastic metal layer, has a second predetermined toughness. In addition, the first predetermined toughness is higher than the second predetermined toughness.

13 Claims, 12 Drawing Sheets

(56) References Cited

U.S. PATENT DOCUMENTS

| | | | | |
|---|---|---|---|---|
| 2008/0223203 A1* | 9/2008 | Ravid | ............... | F41H 5/0442 89/36.02 |
| 2010/0257675 A1* | 10/2010 | DeMoss | ............... | A47C 27/065 5/716 |
| 2014/0026279 A1* | 1/2014 | Horstemeyer | ....... | A41D 13/015 2/2.5 |
| 2015/0377592 A1* | 12/2015 | Roland | ............... | F41H 5/0478 89/36.02 |

* cited by examiner

HYBRID-LAYERED CELL AND BULLETPROOF STRUCTURE HAVING THE SAME

CROSS REFERENCE TO RELATED APPLICATION

This application claims the benefits of China utility patent application Serial No. 201921709979.4, filed on Oct. 11, 2019, the disclosures of which are incorporated by references herein in its entirety.

TECHNICAL FIELD

The present disclosure relates in general to a bulletproof structure, and more particularly to a hybrid-layer cell used for the bulletproof structure.

BACKGROUND

In the history, fighting between spears and shields has been one of important factors in development of military technology. However, in the new firearm era, the development in shielding is actually gradually slower than that in attacking. One observation upon this development gap is the limitation in finding a hard material sufficient for defending a modern attacking weapon. One more observation is that explosion energy has been introduced to boost destruction capacity of attack weapon; for example, the bullet. Rotation and velocity of the bullet have provided this sharp "stone" with unbelievable penetration ability, by which a conventional bullet-defending amour seems to be weak and incomparable. Contrarily, more heavier and heavier amours introduced originally against bullets induces a serious mobility problem to the user.

SUMMARY

An object of the present disclosure is to provide a hybrid-layered cell that can provide superior bulletproof ability.

In this disclosure, the hybrid-layered cell includes a viscous absorber layer, a first elastic metal layer, a viscous-elastic foundation layer and a second elastic metal layer, orderly arranged in a lamination manner. The viscous absorber layer contains a semi-liquid viscous material. The first elastic metal layer, laminated fixedly to the viscous absorber layer, has a first predetermined toughness. The viscous-elastic foundation layer, laminated fixedly to the first elastic metal layer by opposing the viscous absorber layer, has predetermined elasticity and compressibility. The second elastic metal layer, laminated fixedly to the viscous-elastic foundation layer by opposing the first elastic metal layer, has a second predetermined toughness. In addition, the first predetermined toughness is higher than the second predetermined toughness.

In one embodiment of this disclosure, the viscous absorber layer is skinned by a protective film for securing the semi-liquid viscous material in position between the protective film and the first elastic metal layer.

In one embodiment of this disclosure, the first elastic metal layer and the second elastic metal layer are made of the same metal material, and a thickness of the first elastic metal layer is larger than that of the second elastic metal layer.

In one embodiment of this disclosure, the viscous-elastic foundation layer contains a semi-solid viscous material.

In one embodiment of this disclosure, the viscous-elastic foundation layer includes a plurality of first spring elements extending in parallel and individually connecting the first elastic metal layer and the second elastic metal layer. Preferably, the viscous-elastic foundation layer further includes a plurality of second spring elements disposed in parallel on the second elastic metal layer and having a length shorter than that of the first spring elements. More preferably, the viscous-elastic foundation layer further includes a plurality of third spring elements disposed in parallel on the second elastic metal layer and having a length shorter than that of the second spring elements. Specifically, the first spring element, the second spring element and the third spring element are telescoped together on the second elastic metal layer.

In one embodiment of this disclosure, the viscous-elastic foundation layer includes a plurality of first spring elements extending in parallel and individually connecting the first elastic metal layer and the second elastic metal layer. Preferably, the viscous-elastic foundation layer further includes a plurality of second spring elements disposed in parallel on the first elastic metal layer and having a length shorter than that of the first spring elements. More preferably, the viscous-elastic foundation layer further includes a plurality of third spring elements disposed in parallel on the first elastic metal layer and having a length shorter than that of the second spring elements. Specifically, the first spring element, the second spring element and the third spring element are telescoped together on the first elastic metal layer.

Another object of this present disclosure is to provide a bulletproof structure having a plurality of the hybrid-layered cells disposed in a fish-scale arrangement.

As stated, by providing the bulletproof structure having the plurality of the hybrid-layered cells in this disclosure, a high-speed bullet can be "wrapped" by a single cell prior to hurt the user of the bulletproof structure. In addition, to maintain the bulletproof structure provided in this disclosure, only the damage cell should be replaced, and thus the maintenance cost can be greatly reduced.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
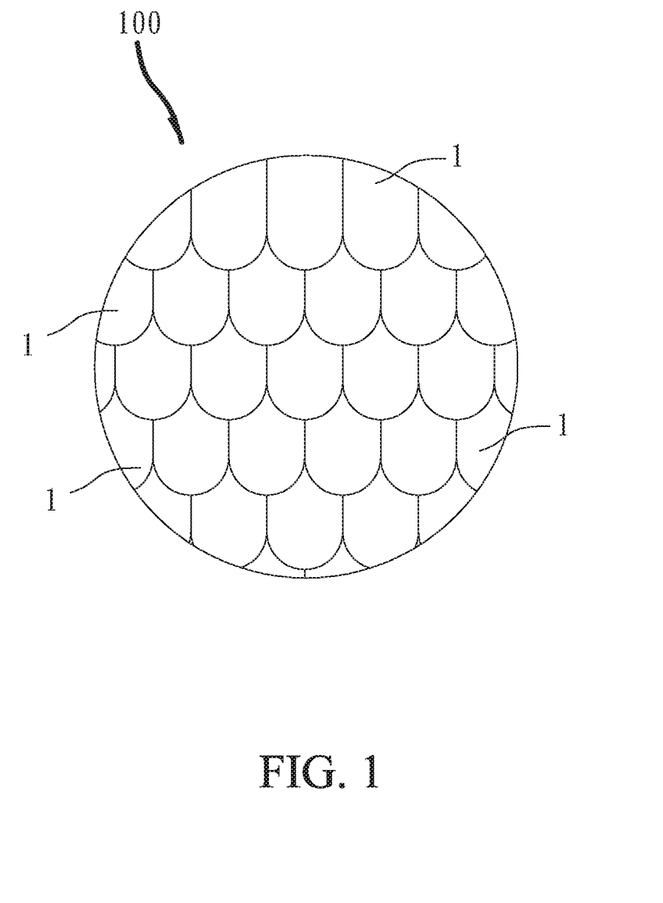
FIG. 1 is a schematic view of a portion of an embodiment of the bulletproof structure in accordance with this disclosure.

Referring to FIG. 1, a schematic view of a portion of an embodiment of the bulletproof structure 100 in accordance with this disclosure is shown. The bulletproof structure 100 has a plurality of hybrid-layered cells 1. The hybrid-layered cells 1 may have different sizes, though the same size shown in this figure, and are disposed, but not limited to, in a fish-scale arrangement. Upon such an arrangement, each individual cell can be replaced independently, and also a jacket or vest made up by this bulletproof structure 100 can have better ventilation and flexibility. In this disclosure, the cell 1 can be glued, adhered or stitched to a base material of the bulletproof structure 100.

Figure 2:
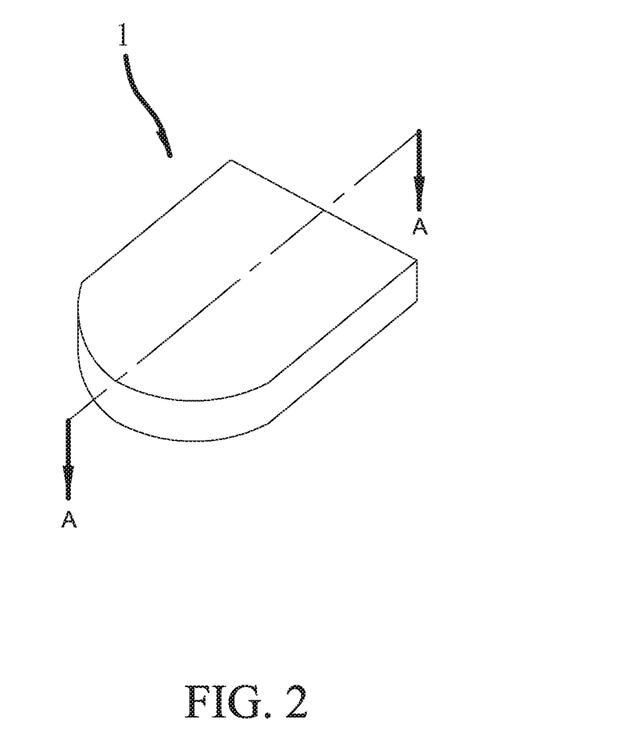
FIG. 2 is a schematic perspective view of the hybrid-layered cell of FIG. 1.
Figure 3:
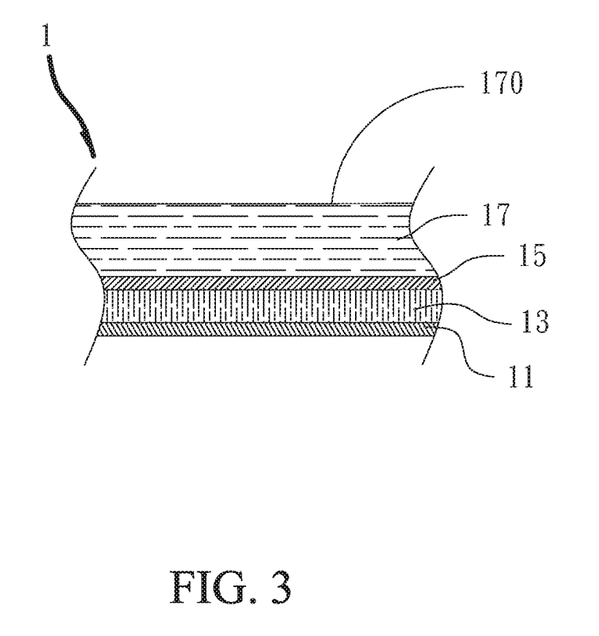
FIG. 3 is a schematic cross-sectional view of a portion of FIG. 2 along line A-A.

Refer now to FIG. 2 and FIG. 3; where FIG. 2 is a schematic perspective view of the hybrid-layered cell 1 of FIG. 1, and FIG. 3 is a schematic cross-sectional view of a portion of FIG. 2 along line A-A. In this embodiment, the hybrid-layered cell 1 includes a viscous absorber layer 17, a first elastic metal layer 15, a viscous-elastic foundation layer 13 and a second elastic metal layer 11, orderly arranged in a lamination manner. Though not shown in the figure, the entire cell 1 can be wrapped, packaged or sealed by a protective package material such as a leather, a plastics or a cloth, for both protection and sealing the cell 1 as a unique piece.

The viscous absorber layer 17 contains a semi-liquid viscous material with a comprehensive viscosity. In this disclosure, the viscous absorber layer 17 is used for retarding rotation and velocity of an incoming bullet; i.e., for absorbing a portion of bullet's kinetic energy. Especially, if the rotation of the intruding bullet can be slowed down, the penetration-ability of the high-speed bullet would be significantly reduced, such that the bullet after passing the viscous absorber layer would have less momentum to hit the first elastic metal layer 15. In comparison to a conventional bulletproof structure who utilizes a steel plate to directly take the impact of the bullet, the hybrid-layered cell 1 of this disclosure arranges the viscous absorber layer 17 to slow down the bullet in advance prior to reach the first elastic metal layer 15, and thereupon the possibility of the bullet to penetrate through the elastic metal layer 15 can be greatly reduced.

As shown in FIG. 3, the viscous absorber layer 17 is skinned by a protective film 170 for securing the semi-liquid viscous material in position between the protective film 170 and the first elastic metal layer 15.

The first elastic metal layer 15, laminated fixedly to the viscous absorber layer 17, has a first predetermined toughness. In this embodiment, the first elastic metal layer 15 can be a steel plate capable of providing sufficient toughness and elasticity against the impact and penetration of the bullet.

The viscous-elastic foundation layer 13, laminated fixedly to the first elastic metal layer 15 by opposing the viscous absorber layer 17, has predetermined elasticity and compressibility. With reasonable elasticity, the viscous-elastic foundation layer 13 can well distribute the impact of the bullet, i.e., performed theoretically as an elastic foundation. On the other hand, with relevant compressibility, the viscous-elastic foundation layer 13 can be squeezed sideward by the bullet through the first elastic metal layer 15 so as to efficiently spread out the impact of the bullet.

Figure 5:
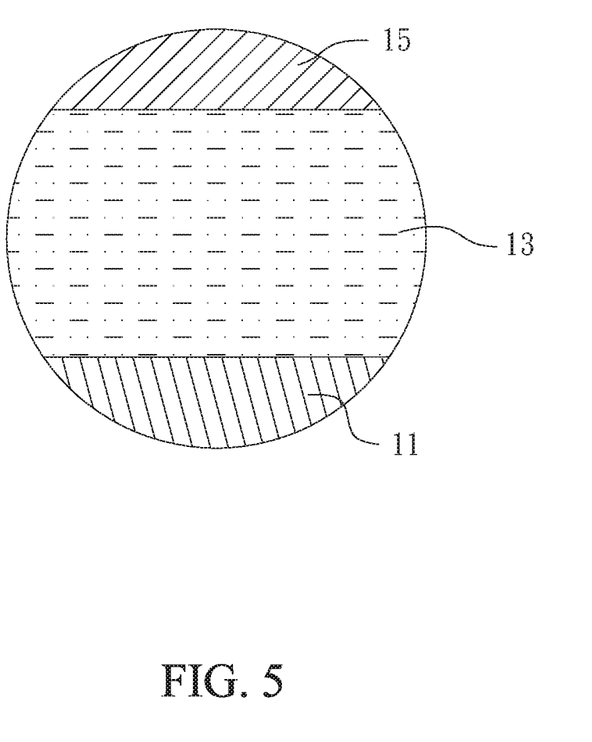
FIG. 5 is a schematic view of a first embodiment of the viscous-elastic foundation layer in accordance with this disclosure.

In this embodiment, as shown in FIG. 5, the viscous-elastic foundation layer 13 contains a semi-solid viscous material, and, though not shown in the figure, this semi-solid viscous material is restrained by films, for example, to deform between the first elastic metal layer 15 and the second elastic metal layer 11. By limiting the semi-solid viscous material to deform between the first elastic metal layer 15 and the second elastic metal layer 11, substantial elasticity and compressibility can be provided to the viscous-elastic foundation layer 13 so as to act, in a recoverable manner, against the forcing from the bullet through the first elastic metal layer 15.

In this embodiment, as shown in FIG. 5, the viscous-elastic foundation layer 13 contains a semi-solid viscous material, and, though not shown in the figure, this semi-solid viscous material is restrained by films, for example, to deform between the first elastic metal layer 15 and the second elastic metal layer 11. By limiting the semi-solid viscous material to deform between the first elastic metal layer 15 and the second elastic metal layer 11, substantial elasticity and compressibility can be provided to the visco-elastic foundation layer 13 so as to act, in a recoverable manner, against the forcing from the bullet through the first elastic metal layer 15.

In this embodiment, since the first predetermined toughness is set to be higher than the second predetermined toughness, thus if the first elastic metal layer 15 and the second elastic metal layer 11 are made of the same metal material, then a thickness of the first elastic metal layer 15 is larger than that of the second elastic metal layer 11.

Figure 4A:
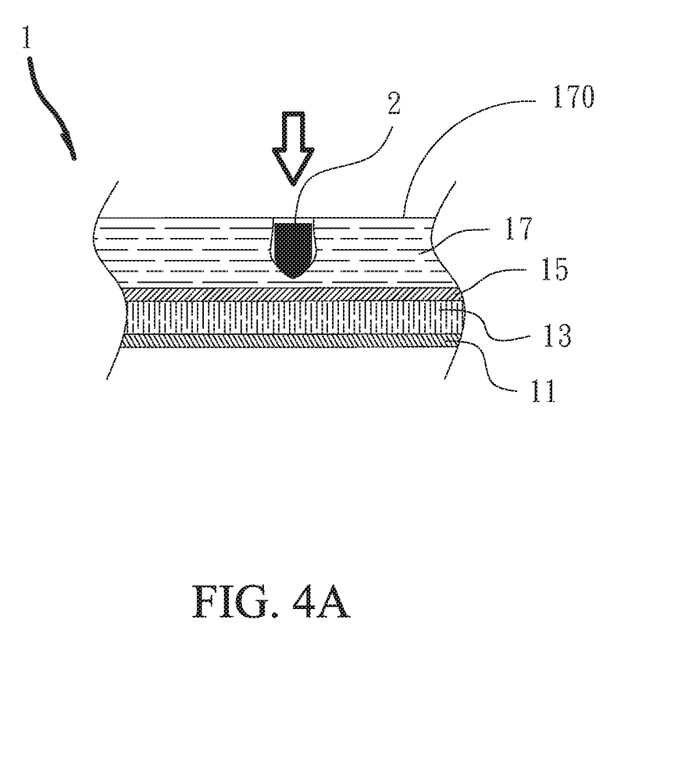
FIG. 4A is a schematic view of the hybrid-layered cell of this disclosure being hit by a bullet, at a stage of the bullet traveling in the viscous absorber layer prior to contacting the first elastic metal layer.
Figure 4B:
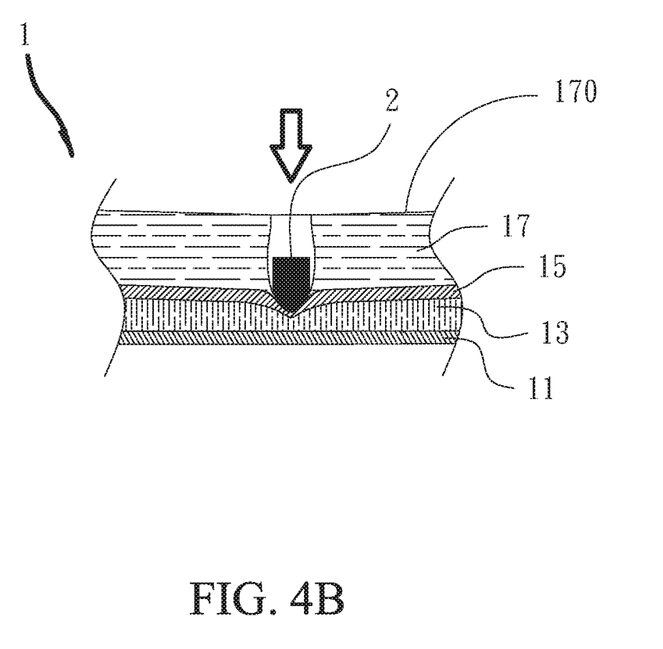
FIG. 4B is a schematic view of the hybrid-layered cell of this disclosure being hit by a bullet, at a stage of the bullet impacting the first elastic metal layer.
Figure 4C:
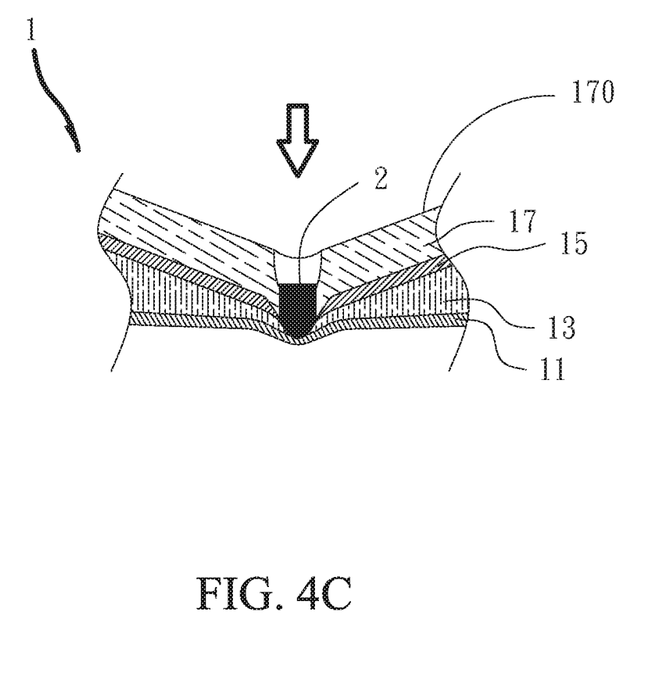
FIG. 4C is a schematic view of the hybrid-layered cell of this disclosure being hit by a bullet, at a stage of the bullet impacting the second elastic metal layer.

Refer now to FIG. 4A through FIG. 4C, where different stages of the hybrid-layered cell 1 of this disclosure being hit by a bullet 2 are shown. FIG. 4A demonstrates a stage of the bullet traveling in the viscous absorber layer 17 prior to contacting the first elastic metal layer 15, FIG. 4B demonstrates a stage of the bullet 2 impacting the first elastic metal layer 15, and FIG. 4C demonstrates a stage of the bullet 2 impacting the second elastic metal layer 11.

In FIG. 4A, the high-speed bullet 2 travels in the viscous absorber layer 17 after breaking the protective film 170, and is surrounded therein by the semi-liquid viscous material.

Contributed by the viscosity of the semi-liquid viscous material, the rotation and velocity of the bullet 2 can be substantially decreased.

In FIG. 4B, as the bullet 2 impacts the first elastic metal layer 15, due to the elastic foundation provided by the viscous-elastic foundation layer 13, the kinetic energy of the bullet 2 would be spread outward along the first elastic metal layer 15, and also shared by the semi-solid viscous material through being squeezed outward by the deformation of the first elastic metal layer 15 by the bullet 2. In addition, since the semi-solid viscous material is squeezed outward from an impact center of the bullet 2, the sideward squeezed semi-solid viscous material would raise the corresponding portion of the first elastic metal plate 15, such that the first elastic metal plate 15 would form as a concave structure centered at the bullet 2. Thereupon, with the edge portion of the first elastic metal plate 15 to be raised up and the central portion thereof to recess downward so as to form the lowest point to receive the bullet 2. Due to the entire concave deformation of the first elastic metal layer 15, the bullet 2 can be "caught" in a softer manner by this glove-like structure, such that the possibility of the bullet 2 penetrating through the first elastic metal layer 15 would be substantially reduced, in comparison to the bullet hard hitting the steel plate in the conventional bulletproof design.

In FIG. 4C, the bullet 2 advances further, the first elastic metal layer 15 deforms downward further, the semi-solid viscous material of the viscous-elastic foundation layer 13 is compressed downward and squeezed outward further, the first elastic metal layer 11 is also deformed to some degree, and the viscous absorber layer 17 is concavely deformed as well. With the entire hybrid-layered cell 1 to deform into a glove-like structure for "catching" an incoming bullet 2, the possibility of the bullet 2 to penetrate through the instant hybrid-layered cell 1 would be significantly lowered. Thus, damage of the bullet 2 to the object after the hybrid-layered cell 1 can be greatly reduced. In other words, with the hybrid-layer cell 1 provided by this disclosure to "wrap" the high-speed bullet 2, possible damage to the protected object would be reduced.

Figure 6:
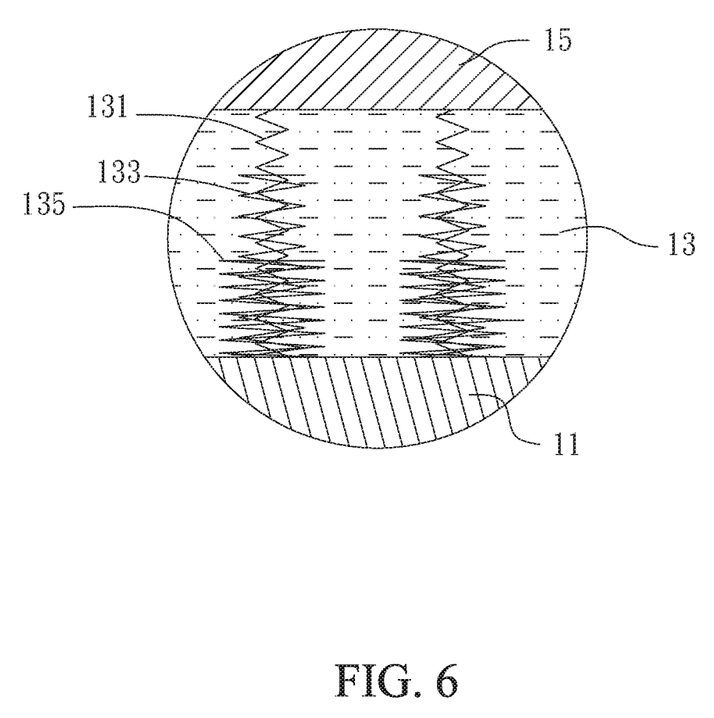
FIG. 6 is a schematic view of a second embodiment of the viscous-elastic foundation layer in accordance with this disclosure.
Figure 7:
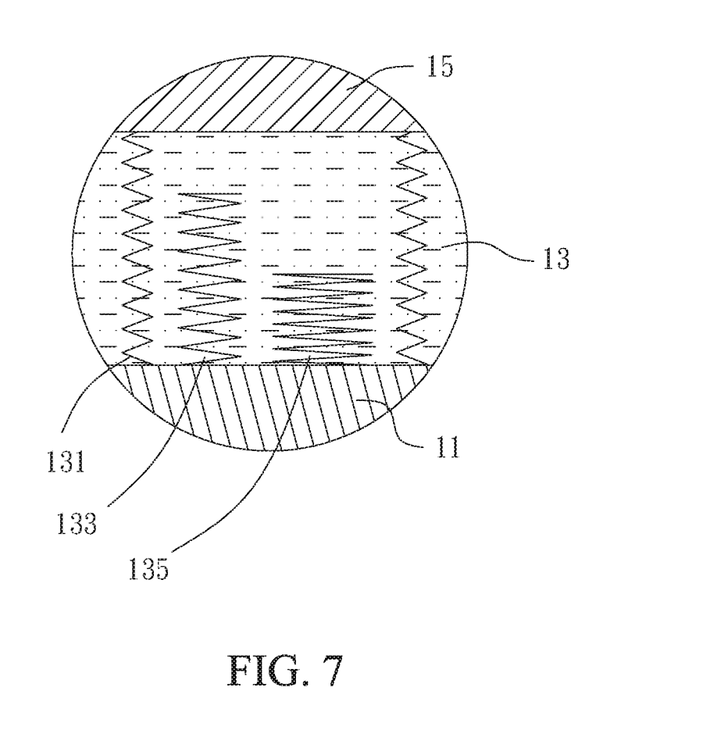
FIG. 7 is a schematic view of a third embodiment of the viscous-elastic foundation layer in accordance with this disclosure.

Referring now to FIG. 6 and FIG. 7, schematic views of a second and a third embodiment of the viscous-elastic foundation layer 13 in accordance with this disclosure are shown, respectively. In both embodiments, in order to enhance the elasticity, the viscous-elastic foundation layer 13 can further include a plurality of first spring elements 131 extending in parallel and individually connecting the first elastic metal layer 15 and the second elastic metal layer 11. Preferably, the viscous-elastic foundation layer 13 can further include a plurality of second spring elements 133 disposed in parallel on the second elastic metal layer 11 and having a length shorter than that of the first spring elements 131. More preferably, the viscous-elastic foundation layer 13 can further include a plurality of third spring elements 135 disposed in parallel on the second elastic metal layer 11 and having a length shorter than that of the second spring elements 133. Specifically, in the second embodiment as shown in FIG. 6, the first spring element 131, the second spring element 133 and the third spring element 135 are telescoped together on the second elastic metal layer 11. On the other hand, in the third embodiment as shown in FIG. 7, the first spring element 131, the second spring element 133 and the third spring element 135 are separately disposed between the first elastic metal layer 15 and the second elastic metal layer 11.

Figure 8:
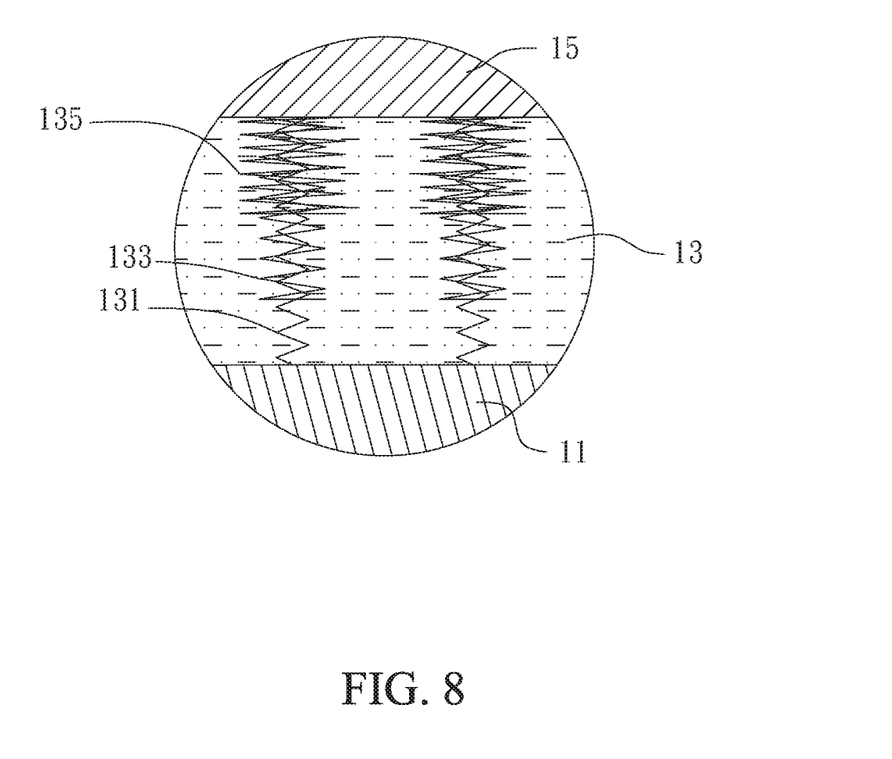
FIG. 8 is a schematic view of a fourth embodiment of the viscous-elastic foundation layer in accordance with this disclosure.
Figure 9:
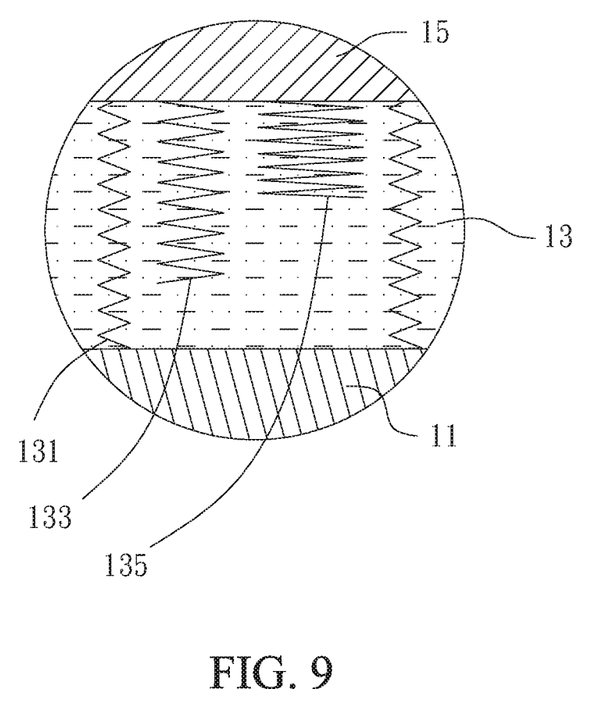
FIG. 9 is a schematic view of a fifth embodiment of the viscous-elastic.

Referring now to FIG. 8 and FIG. 9, schematic views of a fourth and a fifth embodiment of the viscous-elastic foundation layer 13 in accordance with this disclosure are shown, respectively. In both embodiments, in order to enhance the elasticity, the viscous-elastic foundation layer 13 can further include a plurality of first spring elements 131 extending in parallel and individually connecting the first elastic metal layer 15 and the second elastic metal layer 11. Preferably, the viscous-elastic foundation layer 13 can further include a plurality of second spring elements 133 disposed in parallel on the first elastic metal layer 15 and having a length shorter than that of the first spring elements 131. More preferably, the viscous-elastic foundation layer 13 can further include a plurality of third spring elements 135 disposed in parallel on the first elastic metal layer 15 and having a length shorter than that of the second spring elements 133. Specifically, in the fourth embodiment as shown in FIG. 8, the first spring element 131, the second spring element 133 and the third spring element 135 are telescoped together on the first elastic metal layer 15. On the other hand, in the fifth embodiment as shown in FIG. 9, the first spring element 131, the second spring element 133 and the third spring element 135 are separately disposed between the first elastic metal layer 15 and the second elastic metal layer 11.

Figure 10:
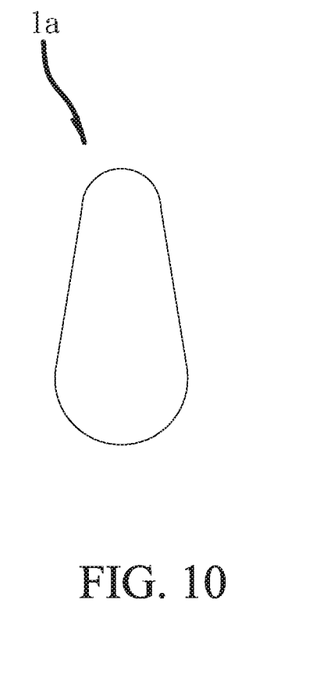
FIG. 10 is a schematic view of another embodiment of the hybrid-layered cell in accordance with this disclosure.

In this disclosure, the configuration of the hybrid-layered cell is not limited to the shape (a nail shape) shown in FIG. 1 and FIG. 2. In practical uses, the configuration of the hybrid-layered cell 1 can be a relevant shape such as the shape 1a shown in FIG. 10.

As described above, by providing the bulletproof structure having the plurality of the hybrid-layered cells in this disclosure, a high-speed bullet can be "wrapped" by a single cell prior to hurt the user of the bulletproof structure. In addition, to maintain the bulletproof structure provided in this disclosure, only the damage cell should be replaced, and thus the maintenance cost can be greatly reduced.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A hybrid-layered cell, comprising:
   a viscous absorber layer, containing a semi-liquid viscous material, wherein the viscous absorber layer retards rotation and velocity of an incoming object impacting the hybrid-layered cell;
   a first elastic metal layer, laminated fixedly to the viscous absorber layer, having a first predetermined toughness;
   a viscous-elastic foundation layer, laminated fixedly to the first elastic metal layer by opposing the viscous absorber layer, having predetermined elasticity and compressibility; and
   a second elastic metal layer, laminated fixedly to the viscous-elastic foundation layer by opposing the first elastic metal layer, having a second predetermined toughness;
   wherein the first predetermined toughness is higher than the second predetermined toughness;
   wherein the first elastic metal layer deforms when impacted by the incoming object, and the viscous elastic foundation layer adheres the first elastic metal layer and the second elastic metal layer together for supporting the first elastic metal layer to resist deformation;

wherein the viscous-elastic foundation layer includes a plurality of coiled spring elements extending in parallel between the first elastic metal layer and the second elastic metal layer;

wherein the plurality of coiled spring elements includes a plurality of first spring elements extending in parallel and individually connecting the first elastic metal layer and the second elastic metal layer, and a plurality of second spring elements disposed in parallel on the second elastic metal layer and having a diameter larger than that of the first spring elements and a length shorter than that of the first spring elements.

2. The hybrid-layered cell of claim 1, wherein the viscous absorber layer is skinned by a protective film for securing the semi-liquid viscous material in position between the protective film and the first elastic metal layer.

3. The hybrid-layered cell of claim 1, wherein the first elastic metal layer and the second elastic metal layer are made of the same metal material, and a thickness of the first elastic metal layer is larger than that of the second elastic metal layer.

4. The hybrid-layered cell of claim 1, wherein the viscous-elastic foundation layer contains a semi-solid viscous material.

5. The hybrid-layered cell of claim 1, wherein the plurality of coiled spring elements includes a plurality of third spring elements disposed in parallel on the one of the first elastic metal layer or the second elastic metal layer and having a diameter larger than that of the second spring elements and a length shorter than that of the second spring elements.

6. The hybrid-layered cell of claim 5, wherein a respective first spring element of the first spring elements, a respective second spring element of the second spring elements, and a respective third spring element of the third spring elements are telescoped together on the second elastic metal layer.

7. A bulletproof structure, comprising a plurality of hybrid-layered cells in a fish-scale arrangement, each of the plurality of hybrid-layered cells further comprising:
- a viscous absorber layer, containing a semi-liquid viscous material, wherein the viscous absorber layer retards rotation and velocity of an incoming object;
- a first elastic metal layer, laminated fixedly to the viscous absorber layer, having a first predetermined toughness;
- a viscous-elastic foundation layer, laminated fixedly to the first elastic metal layer by opposing the viscous absorber layer, having predetermined elasticity and compressibility; and
- a second elastic metal layer, laminated fixedly to the viscous-elastic foundation layer by opposing the first elastic metal layer, having a second predetermined toughness;
- wherein the first predetermined toughness is higher than the second predetermined toughness;
- wherein the first elastic layer deforms as the object impacting on the first elastic metal layer, and the viscous elastic foundation layer adheres the first elastic metal layer and the second elastic metal layer together for supporting the first elastic metal layer to resist deformation; and
- wherein the viscous-elastic foundation layer includes a plurality of coiled spring elements with different lengths extending in parallel between the first elastic metal layer and the second elastic metal layer;
- wherein the plurality of coiled spring elements includes a plurality of first spring elements extending in parallel and individually connecting the first elastic metal layer and the second elastic metal layer, and a plurality of second spring elements disposed in parallel on the second elastic metal layer and having a diameter larger than that of the first spring elements and a length shorter than that of the first spring elements.

8. The bulletproof structure of claim 7, wherein the viscous absorber layer is skinned by a protective film for securing the semi-liquid viscous material in position between the protective film and the first elastic metal layer.

9. The bulletproof structure of claim 7, wherein the first elastic metal layer and the second elastic metal layer are made of the same metal material, and a thickness of the first elastic metal layer is larger than that of the second elastic metal layer.

10. The bulletproof structure of claim 7, wherein the viscous-elastic foundation layer contains a semi-solid viscous material.

11. The bulletproof structure of claim 7, wherein the plurality of coiled spring elements includes a plurality of third spring elements disposed in parallel on the second elastic metal layer and having a diameter larger than that of the second spring elements and a length shorter than that of the second spring elements.

12. The bulletproof structure of claim 11, wherein a respective first spring element of the first spring elements, a respective second spring element of the second spring elements and a respective third spring element of the third spring elements are telescoped together on the second elastic metal layer.

13. A hybrid-layered cell, comprising:
- a viscous absorber layer, containing a semi-liquid viscous material, wherein the viscous absorber layer retards rotation and velocity of an incoming projectile impacting the hybrid-layered cell;
- a first elastic metal layer, laminated fixedly to the viscous absorber layer, having a first predetermined toughness;
- a viscous-elastic foundation layer, laminated fixedly to the first elastic metal layer by opposing the viscous absorber layer, having predetermined elasticity and compressibility and includes a plurality of first spring elements, a plurality of second spring elements, and a plurality of third spring elements, wherein the plurality of first spring elements, the plurality of second spring elements, and the plurality of third spring elements extend in parallel, the plurality of second spring elements having a diameter larger than that of the plurality of first spring elements and a length shorter than the plurality of first spring elements, and the plurality of third spring elements having a diameter larger than that of the plurality of second spring elements and a length shorter the plurality of second spring elements; and
- a second elastic metal layer, laminated fixedly to the viscous-elastic foundation layer by opposing the first elastic metal layer, having a second predetermined toughness;
- wherein the first predetermined toughness is higher than the second predetermined toughness;
- wherein each of the plurality of first spring elements individually connects to both the first elastic metal layer and the second elastic metal layer;
- wherein each of the plurality of second spring elements and the plurality of third spring elements are disposed on the second elastic metal layer;
- wherein a respective first spring element, second spring element, and third spring element are telescoped together; and wherein the first elastic metal layer deforms when impacted by the incoming projectile, and the viscous elastic foundation layer adheres the first elastic metal layer and the second elastic metal layer together for supporting the first elastic metal layer to resist deformation.

* * * * *